United States Patent [19]
Audemard

[11] Patent Number: 5,590,237
[45] Date of Patent: Dec. 31, 1996

[54] APPARATUS AND METHOD FOR CONTROLLING THE ROTATION SPEED OF ELECTRIC MOTORS

[75] Inventor: Gilles Audemard, Mirandola, Italy

[73] Assignee: Hospal AG, Basel, Switzerland

[21] Appl. No.: 713,367

[22] Filed: Jun. 12, 1991

[30] Foreign Application Priority Data

Jun. 22, 1990 [IT] Italy ............................. 67457/90

[51] Int. Cl.$^6$ ........................................... H02P 7/285
[52] U.S. Cl. .................................................. 388/832
[58] Field of Search ................................. 388/825–841

[56] References Cited

U.S. PATENT DOCUMENTS

| | | | |
|---|---|---|---|
| 3,678,356 | 7/1972 | Van Ostrand | 388/829 |
| 3,803,473 | 4/1974 | Stich | 388/829 |
| 3,875,486 | 4/1975 | Barton | 388/829 |
| 4,203,061 | 5/1980 | Minakuchi | 318/490 |
| 4,271,383 | 6/1981 | Endo . | |
| 4,280,104 | 7/1981 | Rzeszewski . | |
| 4,309,645 | 1/1982 | De Villeneave | 388/829 |
| 4,348,621 | 8/1982 | Hyldal | 318/254 |
| 4,384,241 | 5/1983 | Stillhard . | |
| 4,409,529 | 10/1983 | Basford et al. | 318/653 |
| 4,424,470 | 1/1984 | Finch | 318/6 |
| 4,447,709 | 5/1984 | Whitman, III | 318/618 X |

FOREIGN PATENT DOCUMENTS

0118783A1  9/1984  European Pat. Off. .

*Primary Examiner*—David S. Martin

[57] ABSTRACT

The device for controlling the rotation speed of electric motors comprises an adjustable frequency generator (2) generating an output signal ($s_1$) having a frequency which can be adjusted in relation to the desired speed ($v_d$), a pulse generator (3) having a pre-determined period controlled by the adjustable frequency generator in such a way as to generate a control signal ($s_2$) comprising a series of pulses at the adjustable frequency set by the frequency generator (2). The control signal ($s_2$) is provided to a control unit (5) for the motor (6) whose rotation speed is to be controlled. The control unit thus provides a supply to the motor (6) corresponding to the control signal pulses. FIG. 1.

14 Claims, 2 Drawing Sheets

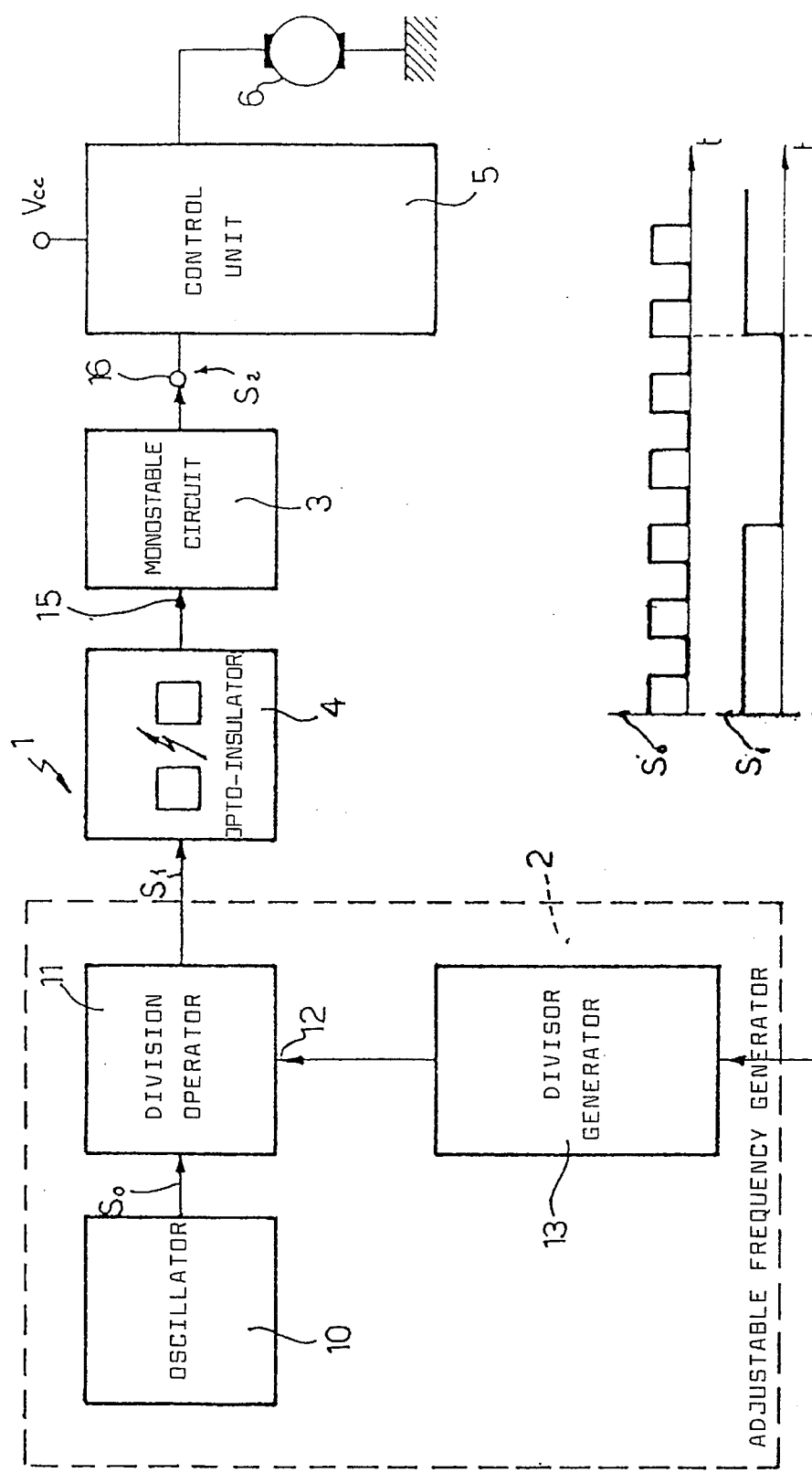
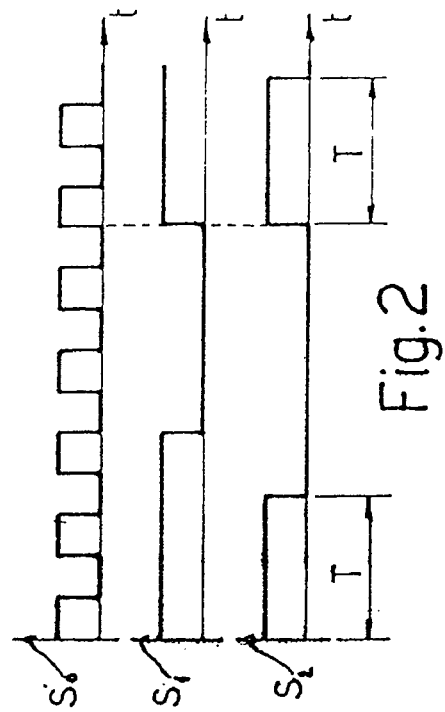
Fig. 2
Fig. 1

APPARATUS AND METHOD FOR CONTROLLING THE ROTATION SPEED OF ELECTRIC MOTORS

BACKGROUND OF THE INVENTION

This invention relates to a device for controlling the rotation speed electric motors, in particular direct current motors, stepping motors brushless motors.

FIELD OF THE INVENTION

Control devices of various types are currently used to control the rotation speed of electric motors. For example, in the case of direct current motors devices are frequently used, which receive as an input a signal correlated with the desired speed and generating as an output a pulse width modulated (PWM) control signal which is filtered and then fed to the motor control circuit. In practice, the control signal generated by these known devices consists in a sequence of pulses, each of which has an initial front (e.g. a rise) occurring at a specific instant determined by the previously fixed working frequency, and a final front (e.g. a decrease) following the initial front after a variable period of time, the pulse having a width or duration which can be varied from a minimum (equal to 0, corresponding to 0 speed) and a maximum (equal to the reciprocal of the fixed working frequency; corresponding to maximum speed of the motor with an uninterrupted supply). As a consequence, the control signal is substantially an analog fixed frequency signal, given that the speed information is coded in the variable width of the pulses.

This kind of device presents the drawback of requiring, for its implementing, high technology means, thus fairly expensive.

For controlling the rotation speed of electric motors, it is also known to use devices generating an amplitude modulated signal. This kind of device, although advantageous as far as filtering is concerned (the fixed frequency signal can in fact be filtered easily), is disadvantageous when the control signal has to be passed to a transmission line, in as much as, being an analog signal, it is sensitive to distortions generated by the line itself. Also, this device is not suitable for the control of other types of motors, such as stepping motors.

DESCRIPTION OF THE RELATED ART

The object of this invention is therefore to provide a device for controlling the rotation speed of electric motors which overcomes the disadvantages present in the known art and which in particular is substantially independent of line distortions and can be used to control different types of motors with small modifications.

In accordance with this invention a device for controlling the rotation speed of electric motors incorporating a unit for controlling an electric motor includes an adjustable frequency generator for generating an output signal which has a frequency which can be varied in relation to the desired rotation speed, and demodulation means controlled by the said adjustable frequency generator for generating a control signal, the control signal being fed to the control unit and thus controlling the latter by a selective supply to the motor.

BRIEF DESCRIPTION OF THE DRAWINGS

For a better understanding of this invention two embodiments will be described purely by way of non-restrictive examples with reference to the appended drawing in which:

FIG. 1 is a general block diagram of the device according to the invention;

FIG. 2 shows the change in the course of time of certain signals in the diagram in FIG. 1;

DESCRIPTION OF THE PREFERRED EMBODIMENTS

Figure 4:
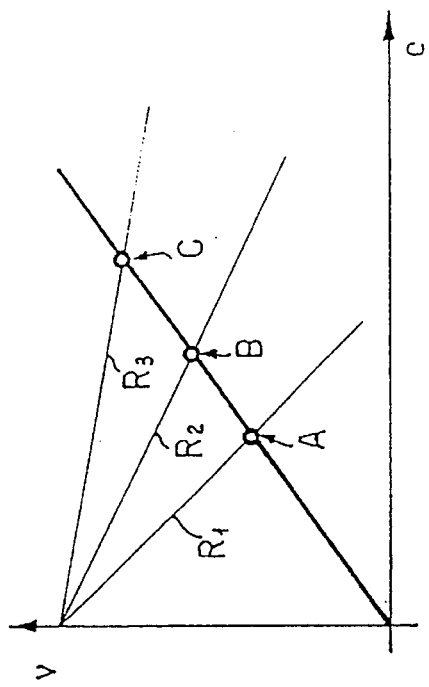
FIG. 4 shows the torque/speed characteristic which can be obtained with the control unit constructed as illustrated in FIG. 3.

With reference to FIG. 1, the control device according to this invention, indicated as a whole by 1, incorporates substantially one adjustable frequency generator 2 generating a signal $s_1$ which has an adjustable frequency which depends on the desired rotation speed, demodulation means 3, such as a monostable circuit receiving signal $s_1$, possibly with an interposed optical isolation device 4, and generating an output control signal $s_2$ of a pre-determined duration and frequency equal to that of $s_1$ and a control device or unit 5 for a motor 6 which controls the supply to said motor 6 on the basis of control signal $s_2$.

In particular generator 2 includes an oscillator 10 generating a square wave output signal $s_o$ (e.g. at the frequency of 10 MHz) connected at the output to a programmable division operator 11 which is capable of dividing the frequency of the signal $s_o$ provided by the oscillator by the value (division specified at its control input 12 by means of a divisor generator 13. In turn divisor generator 13 is controlled by a control signal $v_d$ corresponding to the desired motor speed (provided for example by an operator via a keyboard or other similar device). Divisor generator 13 thus generates an output digital signal (e.g. a 9 bit signal) which specifies by how much the, frequency generated by oscillator 10 shall be divided (i.e. the modulus of the divisor) in accordance with the desired speed. Signal $s_1$ (see FIG. 2, in which the frequency is divided by five, which however is very much less than the values actually used, is illustrated for clarity) thus has the form of a square wave with a frequency which can be varied in proportion to the desired rotation speed of motor 6. Typically the frequency of $s_1$ may vary from 0 to 20 KHz, corresponding to a 0 supply and 0 motor speed and a continuous supply and maximum motor speed respectively (in the latter case division is for example by 500).

This signal $s_1$, passed to an input 15 of monostable circuit 3, causes the latter to generate a sequence of pulses whose frequency is equal to the variable frequency of signal $s_1$ (and therefore varies between 0 and 20 KHz), whose duration "T" is determined by the monostable circuit itself. The predetermined duration of the pulses generated by monostable circuit 3 is selected to be equal to the period corresponding to the maximum frequency generated by division operator 11, i.e. 50 μsec in the example mentioned above. In practice control signal $s_2$ passed to input 16 of control unit 5 has a duty-cycle which can be adjusted from 0 (when $s_1$ has a 0 frequency and the monostable circuit does not generate any output pulse) to 100% (when $s_1$ has a maximum frequency of 20 KHz and monostable circuit 3 generates a continuous output signal. Signal $s_2$, of the digital type, may therefore be used directly to control motors of different types via control unit 5.

The latter provides a feed to motor 6 by connecting it to supply $V_{DC}$ whenever a control signal pulse $s_2$ is present at input 16. As a consequence, the greater the frequency of the control signal the longer power is supplied to the motor and the latter therefore rotates faster. In the limit, when the duty-cycle of control signal $s_2$ is equal to 100% (and the control signal is in practice the single continuous pulse) the motor is powered without interruption and rotates at its maximum speed.

With control $s_2$ according to the invention it is possible to control directly control units constructed in different ways, depending on the type of control desired. For example motors of different types (direct current, stepping or brushless motors) can be controlled with or without a braking action, and with control in the first, second or third quadrant.

Figure 3:
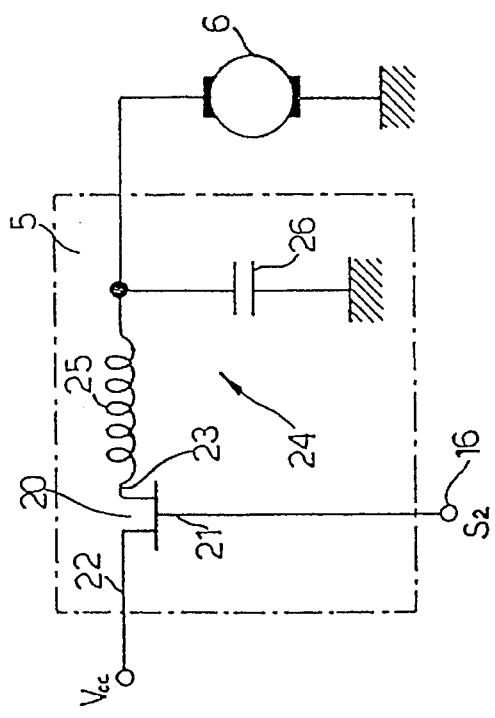
FIG. 3 is an overall circuit diagram of a first embodiment of the motor control unit indicated in FIG. 1.

FIG. 3 illustrates an example embodiment of control unit 5 in the case of a direct current motor which acts in the first quadrant without braking. As is known, in this embodiment unit 5 incorporates a controllable power switch 20, e.g. a MOSFET power transistor, having a control terminal or port 21 connected to input 16 and therefore receiving control signal $s_2$, a terminal 22 connected to supply voltage $V_{DC}$ and a terminal 23 connected to an LC filter 24 comprising an inductance 25 and a condenser 26. In detail, the first terminal of inductance 25 is connected to terminal 23 of controlled power switch 20 and the other terminal is connected to motor 6, while condenser 26 is connected to a first terminal at the point of connection between inductance 25 and motor 6, with its other terminal connected to ground, defining a reference potential line.

The operation of the circuit in FIG. 3 is as follows: whenever switch 20 receives a pulse generated by monostable circuit 3 at its control terminal 21 it closes, connecting motor 6 with supply $V_{DC}$ via filter 24; at the end of the pulse switch 20 opens, disconnecting the motor from the supply. Thus depending on the frequency (and therefore the duty-cycle) of signal $s_2$ generated by monostable circuit 3, the motor is supplied with a greater or lesser frequency, and therefore rotates at a greater or lesser speed.

With the circuit in FIG. 3 it is possible to obtain different torque values depending on the resistance load $R_1$, $R_2$, $R_3$ of the motor, as illustrated in FIG. 4, in which the abscissa represents the torque c and the ordinate the rotation speed v of the motor. As may be seen, different working points (A, B, C) with corresponding torque/speed values can be obtained depending on the torque required from the motor.

Figure 5:
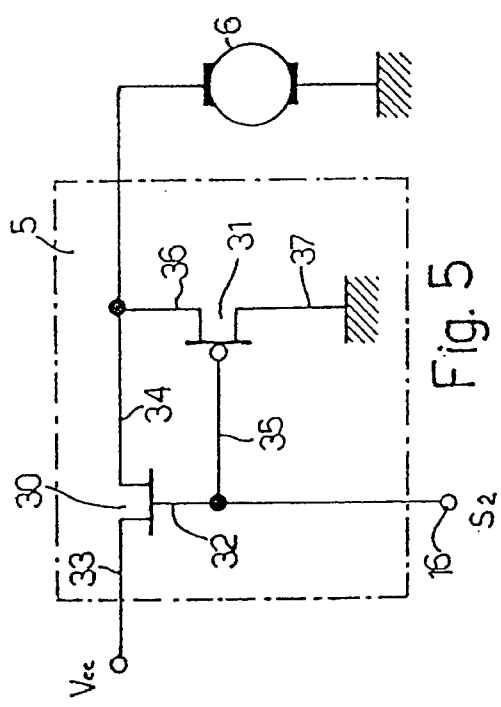
FIG. 5 is an overall circuit diagram of a second embodiment of the motor control unit illustrated in FIG. 1.

FIG. 5 illustrates another embodiment of control unit 5. In this case unit 5 controls the first quadrant with a braking effect. In detail, controlled unit 5 FIG. 5 incorporates a first controlled power supply switch 30, a second controlled braking power switch 31, which operates in the opposite phase to switch 30. Switch 30, consisting again of a MOSFET power transistor, is similar to switch 20, and therefore has a control terminal 32 connected to input 16 which therefore receives control signal $s_2$, a terminal 33 connected to supply voltage $V_{DC}$, and a terminal 34 connected to motor 6 (in this case however no filter is provided). Switch 31, which acts in the opposite phase to switch 30, as indicated symbolically in FIG. 5 by the circle on its control terminal 35, is connected via the said control terminal 35 to input 16 of control unit 5 and thus also receives control signal $s_2$. Switch 31 also has a terminal 36 connected to terminal 34 of switch 30 (and motor 6), and a further terminal 37 connected to ground.

The operation of the circuit in FIG. 5 is as follows. In the presence of the signal pulse $s_2$, switch 30 closes, connecting motor 6 to supply voltage $V_{DC}$, as in the case of the circuit in FIG. 3. At this stage switch 31, being in the opposite phase with respect to switch 30, is open and therefore has no effect. At the end of signal pulse $s_2$ switch 30 opens, disconnecting the motor from supply $V_{DC}$, and switch 31 closes, connecting the motor to earth, thus producing a braking effect. Again in this case, given that the opening and closing times of switches 30 and 31 depend on the frequency (and therefore the duty-cycle) of control signal $s_2$, a greater or lesser rotation speed of the motor is obtained depending on the value of that frequency.

Figure 6:
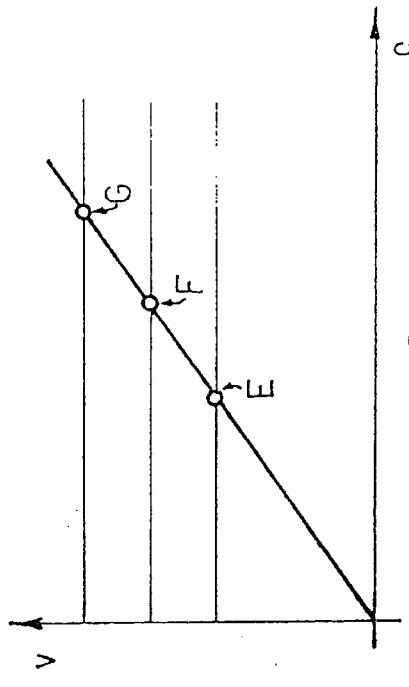
FIG. 6 illustrates the torque/speed characteristic which can be obtained with the control unit constructed as illustrated in FIG. 5.

The torque/speed characteristics shown in FIG. 6, similar to FIG. 4 and therefore having torque c as the abscissa and speed v as the ordinate, are therefore obtained. As is known, in this case it is possible to obtain only one torque value for a given speed (in this figure the working points obtained are indicated by E, F, G).

With this invention it is therefore possible to adjust the rotation speed of a motor by means of a device which is substantially unaffected by line distortions. In fact, unlike known devices, in accordance with this invention the signal passed to the control unit is of the digital type, given that coding of the desired speed is obtained by frequency modulation, and the length of the pulses is fixed (as determined by monostable circuit 3). As a consequence digital to analog conversion is only performed in the control unit, and the control signal can be passed down a transmission line without the loss of coded information.

The device according to this invention is advantageous because of the simplicity of its circuits (despite the greater difficulty in filtering due to the variable frequency), may be applied to motors of different types and can easily be adapted to different types of control, as illustrated by way of example in FIGS. 3-6.

The device permits precise and accurate control of speed, and where necessary an optical insulating device 4 may be introduced (as required in some applications, for example for safety reasons) to separate the adjustable frequency $s_1$ signal generation components (part of the frequency modulation comprising adjustable frequency generator 2) from the control signal generation part (demodulation part, including monostable circuit 3) without causing signal distortion.

It is clear that modifications and variants which do not go beyond the scope of the invention may be made to the embodiments of the control device according to this invention described above. In particular it is emphasised that the adjustable frequency generator may also be constructed using different types of frequency modulators, or may consist of a microprocessor programmed to generate the variable frequency signal on the basis of a desired speed inputted from the outside, or on the basis of pre-programmed operating needs, or such needs established at a given time. In particular, in the case in which a microprocessor is provided, this may receive as an input a further signal correlated to the effective rotation speed of motor 6, as obtained for example by means of an encoder, and compensate for any rotation speed errors present, thus forming a closed loop control system.

The demodulation means may be provided in any suitable way; e.g. a phase link loop (PLL circuit) may be provided instead of monostable pulse generator 3.

Also the controlled power switches may be of any type appropriate to the specifications required, and in particular in the embodiment illustrated in FIG. 5 the two switches may be either of the opposed type, so as to obtain opposite phase functioning automatically, or may be of the same type, and an inverter may be provided between input 16 to control unit 5 and one of the controlled terminals.

Also, as already mentioned, an optical insulating device may or may not be provided, and the motor control unit may be utilised in different ways.

What is claimed is:

1. An apparatus for controlling the rotation speed of an electric motor, the apparatus comprising:

means for generating a first signal (S1) with pulses having a variable frequency corresponding to a desired rotation speed of the motor;

means for transforming the first signal (S1) into a second signal (S2) with pulses having the frequency of the first signal (S1) and a predetermined constant duration; and means for supplying the motor with a pulsating voltage having a frequency and a pulse duration substantially equal to the frequency and the pulse duration of the second signal (S2).

2. An apparatus according to claim 1, wherein the means for generating the first signal (S1) comprises means for generating an original signal (SO) with pulses having a constant frequency, and means for dividing the constant frequency by a divisor corresponding to a desired rotation speed of the motor.

3. An apparatus according to claim 2, wherein the means for generating the initial signal (SO) comprises an oscillator for generating a square wave signal.

4. An apparatus according to claim 1, wherein the means for transforming the first signal (S1) into the second signal (S2) comprises a monostable circuit.

5. An apparatus according to claim 1, further comprising means for providing optoinsulation between the means for generating the first signal (S1) and the means for transforming the first signal (S1) into the second signal (S2).

6. An apparatus according to claim 1, wherein the frequency of the first signal (S1) is variable between a lower value and an upper value respectively corresponding to a minimal and to a maximal speed of the motor.

7. An apparatus according to claim 6, wherein the predetermined duration of the pulses of the second signal (S2) is substantially equal to the inverse of the upper value of the variable frequency of the first signal (S1).

8. An apparatus according to claim 1, wherein the means for supplying the motor with a pulsating voltage comprises a controlled power switch having a first control terminal for receiving the second signal (S2), a second terminal connected to a DC voltage supply, and a third terminal connected to the motor.

9. An apparatus according to claim 8, wherein the means for supplying the motor with a pulsating voltage further comprises an LC filter connected to the third terminal of the controlled power switch.

10. An apparatus according to claim 1, wherein the means for supplying the motor with a pulsating voltage comprising:

a first controlled power switch having a first control terminal for receiving the second signal (S2), a second terminal connected to a DC voltage supply, and a third terminal connected to the motor, and a second controlled power switch having a first control terminal for receiving the second signal (S2), a second terminal connected to the motor, and a third terminal connected to a reference potential line, whereby the second controlled power switch operates in opposite phase with respect to the first controlled power switch.

11. A method for controlling the rotation speed of an electric motor, comprising the steps of:

generating a first signal (S1) with pulses having a variable frequency corresponding to a desired rotation speed of the motor;

transforming the first signal (S1) into a second signal (S2) with pulses having the frequency of the first signal and a predetermined constant duration; and supplying the motor with a pulsating voltage having a frequency and a pulse duration substantially equal to the frequency and the pulse duration of the second signal (S2).

12. A method according to claim 11, wherein the step of generating the first signal comprises the substeps of generating an original signal (SO) with pulses having a constant frequency and duration, and dividing the constant frequency by a divisor corresponding to a desired rotation speed of the motor.

13. A method according to claim 11, wherein the frequency of the first signal (S1) is variable between a lower value and an upper value respectively corresponding to a minimal speed and to a maximal speed of the motor.

14. A method according to claim 12, wherein the predetermined duration of the pulses of the second signal (S2) is substantially equal to an inverse of the upper value of the variable frequency of the first signal (S1).

* * * * *